(12) United States Patent
Jiao et al.

(10) Patent No.: US 10,838,917 B2
(45) Date of Patent: Nov. 17, 2020

(54) JUNK PICTURE FILE IDENTIFICATION METHOD, APPARATUS, AND ELECTRONIC DEVICE

(71) Applicant: BEIJING KINGSOFT INTERNET SECURITY SOFTWARE CO., LTD., Beijing (CN)

(72) Inventors: Guoqiang Jiao, Beijing (CN); Qidong Yang, Beijing (CN); Xiliang Bai, Beijing (CN); Xueshi Du, Beijing (CN); Nan Zhang, Beijing (CN); Yong Chen, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 537 days.

(21) Appl. No.: 15/322,995

(22) PCT Filed: Jun. 23, 2015

(86) PCT No.: PCT/CN2015/082115
§ 371 (c)(1),
(2) Date: Dec. 29, 2016

(87) PCT Pub. No.: WO2016/000545
PCT Pub. Date: Jan. 7, 2016

(65) Prior Publication Data
US 2017/0132239 A1 May 11, 2017

(30) Foreign Application Priority Data

Jun. 30, 2014 (CN) .......................... 2014 1 0309644

(51) Int. Cl.
*G06F 16/00* (2019.01)
*G06F 16/14* (2019.01)
(Continued)

(52) U.S. Cl.
CPC ............ *G06F 16/148* (2019.01); *G06F 16/16* (2019.01); *G06F 16/5866* (2019.01); *G06Q 30/0641* (2013.01)

(58) Field of Classification Search
None
See application file for complete search history.

(56) References Cited

U.S. PATENT DOCUMENTS 7,096,418 B1 * 8/2006 Singhal ............... G06F 16/9574
715/205
10,305,833 B1 * 5/2019 Dennis .................... H04L 67/10
(Continued)

FOREIGN PATENT DOCUMENTS

CN        1385854 A     12/2002
CN      101256575 A      9/2008
(Continued)

OTHER PUBLICATIONS

Office action from SIPO dated Mar. 26, 2018 for CN application 201410309644.9.
(Continued)

*Primary Examiner* — Jean M Corrielus
(74) *Attorney, Agent, or Firm* — David D. Brush; Westman, Champlin & Koehler, P.A.

(57) ABSTRACT

A method and apparatus for identifying a junk file of picture category, and electronic device are provided. The method included: acquiring a storage path for storing files of picture category; acquiring a filename feature of a file in the storage path; and on the basis of the filename feature, determining whether the file in the storage path is a junk file picture category.

18 Claims, 4 Drawing Sheets

(51) Int. Cl.
*G06F 16/16* (2019.01)
*G06F 16/58* (2019.01)
*G06Q 30/06* (2012.01)

(56) References Cited

U.S. PATENT DOCUMENTS

| | | | | |
|---|---|---|---|---|
| 10,318,479 | B2* | 6/2019 | Yuan | G06F 16/122 |
| 10,540,325 | B2* | 1/2020 | Jiao | G06F 16/162 |
| 10,664,443 | B2* | 5/2020 | Yu | G06F 3/0653 |
| 2004/0036716 | A1* | 2/2004 | Jordahl | G06F 16/24578 715/713 |
| 2007/0150948 | A1* | 6/2007 | De Spiegeleer | G06F 21/565 726/22 |
| 2008/0034006 | A1* | 2/2008 | Lee | G06F 16/16 |
| 2013/0077936 | A1 | 3/2013 | Cho et al. | |
| 2014/0365451 | A1* | 12/2014 | Chen | G06F 16/11 707/692 |
| 2017/0124098 | A1* | 5/2017 | Yuan | G06F 16/122 |

FOREIGN PATENT DOCUMENTS

| | | | | | |
|---|---|---|---|---|---|
| CN | 101582072 | A | | 11/2009 | |
| CN | 102567319 | A | | 7/2012 | |
| CN | 102654872 | A | * | 9/2012 | |
| CN | 102880713 | A | * | 1/2013 | |
| CN | 102970420 | A | | 3/2013 | |
| CN | 103020645 | A | | 4/2013 | |
| CN | 102550714 | B | * | 7/2013 | |
| CN | 103365882 | A | | 10/2013 | |
| CN | 110019033 | A | * | 7/2019 | H04L 51/12 |

OTHER PUBLICATIONS

Office action from SIPO dated Jul. 9, 2018 for CN application 201410309644.
English translation of the Office action from SIPO dated Mar. 26, 2018 for CN application 201410309644.9.
English translation of the Office action from SIPO dated Jul. 9, 2018 for CN application 201410309644.
English translation of the Written Opinion of the International Searching Authority dated Aug. 27, 2015 for corresponding International Application No. PCT/CN2015/082115, filed Jun. 23, 2015.
International Search Report dated Aug. 27, 2015 for corresponding International Application No. PCT/CN2015/082115, filed Jun. 23, 2015.
Written Opinion of the International Searching Authority dated Aug. 27, 2015 for corresponding International Application No. PCT/CN2015/082115, filed Jun. 23, 2015.
Office Action dated Nov. 20, 2018 for corresponding Chinese application No. 201410309644.9.

* cited by examiner

Fig. 6 ical Property Office on Jun. 30, 2014 by BEIJING KINGSOFT INTER-

JUNK PICTURE FILE IDENTIFICATION METHOD, APPARATUS, AND ELECTRONIC DEVICE

CROSS REFERENCE TO RELATED APPLICATION

This application is a US national phase application of an International Application No. PCT/CN2015/082115, filed on Jun. 23, 2015, which claims priority to and benefits of Chinese Patent Application No. 201410309644.9, entitled as "a method and an apparatus for identifying a junk file of picture category", and filed with State Intellectual Property Office on Jun. 30, 2014 by BEIJING KINGSOFT INTERNET SECURITY SOFTWARE CO., LTD., the entire content of which is incorporated herein by reference.

FIELD

The present disclosure relates to a file processing field, and more particularly to a method, an apparatus and a system for identifying a junk file of picture category.

BACKGROUND

With the development of computer and Internet technology, a user may install various applications in a computer and in a mobile terminal. When the user starts the application, one or more storage paths corresponding to the application may be triggered. During a process of using the application, a lot of junk files may be generated and stored in the one or more storage paths, such that a storage space of the device may be occupied. The gradual accumulation may lead to the insufficient storage space of the device. Since the storage space of the mobile terminal is less than that of the computer, occupation of the storage space by the junk files even leads to a slower responding speed of the mobile terminal, thereby seriously affecting the usage. In particular, the storage space occupied by files of picture category is more than that occupied by text information. Therefore, it needs urgently to identify and clean up junk files of picture category.

Currently the cleaning of documents aims to cache files, for example, the user may select to clean up cache data, or clean up cache data separately for different applications. However, they are cleaned up in batch and junk files of picture category in the mobile terminal cannot be identified from various data, such that it is difficult to clean up the junk files and to store the useful files simultaneously, thus bringing the poor user experience.

SUMMARY

Embodiments of the present disclosure seek to solve at least one of the problems existing in the related art to some extent. Accordingly, an objective of a first aspect of the present disclosure is to provide a method for identifying a junk file of picture category, which may realize automatic identification of the junk file of picture category with high identification efficiency and accuracy.

An objective of a second aspect of the present disclosure is to provide an apparatus for identifying a junk file of picture category.

An objective of a third aspect of the present disclosure is to provide an electronic device.

In order to achieve the above objectives, embodiments of the first aspect of the present disclosure provide a method for identifying a junk file of picture category, including: acquiring a storage path for storing files of picture category; acquiring a filename feature of a file in the storage path; and determining whether the file in the storage path is a junk file of picture category according to the filename feature.

Embodiments of the second aspect of the present disclosure provide an apparatus for identifying a junk file of picture category, including: a first acquiring module, configured to acquire a storage path for storing files of picture category; a second acquiring module, configured to acquire a filename feature of a file in the storage path; and a first determining module, configured to determine whether the file in the storage path is a junk file of picture category according to the filename feature.

Embodiments of the third aspect of the present disclosure provide an electronic device, including the apparatus for identifying a junk file of picture category provided in embodiments of the second aspect of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in details in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

It should be noted that, embodiments of the present disclosure are preferably applicable to a mobile terminal, for example, the mobile terminal with IOS operating system (which is an operating system of a handheld device developed by Apple inc.), Android operating system (which is an operating system based on free and open Linux source codes), Windows phone operating system (which is an operating system of a mobile phone published by Microsoft inc.). Also, the embodiments are certainly applicable to a personal computer and other intelligent mobile terminals, which is not limited herein. It should be understood that, in embodiments of the present disclosure, the mobile phones may be hardware devices with various operating systems, such as mobile phones, tablet computers, personal digital assistants, e-books or the like.

In the following, a method and an apparatus for identifying a junk file of picture category and an electronic device according to embodiments of the present disclosure will be described with reference to drawings.

Figure 1:
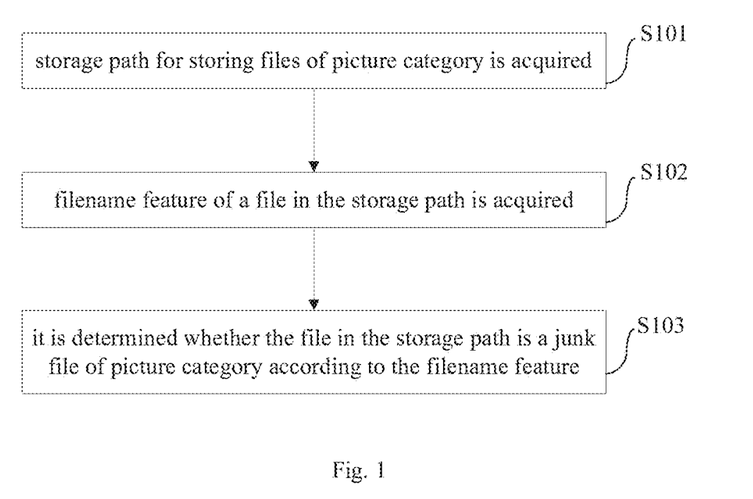
FIG. 1 is a flow chart of a method for identifying a junk file of picture category according to an embodiment of the present disclosure.

FIG. 1 is a flow chart of a method for identifying a junk file of picture category according to an embodiment of the present disclosure.

As shown in FIG. 1, the method for identifying a junk file of picture category includes followings.

S101, a storage path for storing files of picture category is acquired.

In an embodiment of the present disclosure, in order to identify the junk file of picture category, it needs to screen out the storage path storing files of picture category therein from the storage paths triggered by various applications in the terminal, thereby identifying the picture file in this storage path. Specifically, first a file category of each file in each storage path in the terminal is acquired, and then a ratio of files of picture category to all files in each storage path in the terminal is determined according to the file category, and a storage path with the ratio of files of picture category greater than a first predetermined ratio is taken as the storage path storing files of picture category therein.

The first predetermined ratio may be set as desired, e.g., which may be 90%.

S102, a filename feature of a file in the storage path is acquired.

In an embodiment of the present disclosure, the filename feature refers to a character string feature in the filename, such as the number of separators contained in the filename, a format of a character sequence in the filename, whether the filename contains a character string indicating resolution or other attribute, and the like.

S103, it is determined whether the file in the storage path is a junk file of picture category according to the filename feature.

In embodiments of the present disclosure, since the filenames of junk files of picture category have some common features, such as the filename contains a plurality of separators, the filename contains a character sequence indicating resolution attribute, the filename is a random character sequence of an MD5 value, the filename is a random number sequence, or the like. If most files in the storage path have these common features, it indicates that the file in the storage path is a junk file of picture category. Therefore, as an alternative determining way, it may be determined whether the file in the storage path is a junk file of picture category in one or more of following ways A1, A2, A3, and A4.

A1, according to the filename feature, it is determined whether in the storage path a ratio of files each of which has a filename with the number of separators greater than a predetermined value to all files in this storage path is greater than a second predetermined ratio, if yes, it is determined that the file in the storage path is a junk file of picture category. For example, the separator may be "_", "%", "#", "&", "*", "@" and the like. The predetermined value may be any value, for example, 5. That is, if in the storage path the ratio of files each of which has a filename with the number of separators exceeding 5 to all files in this storage path is greater than the second predetermined ratio, it is determined that the file in the storage path is a junk file of picture category.

A2, according to the filename feature, it is determined whether in the storage path a ratio of files each of which has a filename with a character string indicating resolution attribute to all files in this storage path is greater than a second predetermined ratio, if yes, it is determined that the file in the storage path is a junk file of picture category. The character string indicating resolution attribute may be a character string with a number sequence * (or ×) a number sequence, such as 120*210, 100*180. If in the storage path the ratio of files each of which has a filename with a character string indicating resolution attribute to all files in this storage path exceeds the second predetermined ratio, it is determined that the file in the storage path is a junk file of picture category.

A3, according to the filename feature, it is determined whether in the storage path a ratio of files each of which has a filename being a random character sequence of an MD5 value to all files in this storage path is greater than a second predetermined ratio, if yes, it is determined that the file in the storage path is a junk file of picture category. The MD5 (Message-Digest Algorithm 5) value is a hexadecimal character string with a certain length, which is acquired by transforming a character string with an arbitrary length via the Message-Digest Algorithm. For example, 0c29def086ced83435dc542db0f4c356 is an example of the random character sequence of an MD5 value. If in the storage path the ratio of files each of which has a filename being the random character sequence of an MD5 value to all files in this storage path exceeds the second predetermined ratio, it is determined that the file in the storage path is a junk file of picture category.

A4, according to the filename feature, it is determined whether in the storage path a ratio of files each of which has a filename being a random number sequence to all files in this storage path is greater than a second predetermined ratio, if yes, it is determined that the file in the storage path is a junk file of picture category. In an embodiment of the present disclosure, the random number sequence is a pure numeric string with a certain length. The length of the random number sequence is acquired by a statistical analysis on junk files of picture category. For example, the length of the random number sequence may be 8-11, and if in the storage path the ratio of files each of which has a filename being a 8-11-digit random number sequence to all files in this storage path exceeds the second predetermined ratio, it is determined that the file in the storage path is a junk file of picture category.

It should be understood that, in ways A1, A2, A3, A4, the second predetermined ratio may be set in advance according to requirement. In an embodiment of the present disclosure, the second predetermined ratio may be 90%. Certainly, in other embodiments of the present disclosure, the second predetermined ratio may be another value.

In embodiments of the present disclosure, after identifying the junk file of picture category, an act of cleaning up the junk file of picture category may be performed. In particular, the identified junk file of picture category may be cleaned up automatically, also a prompt message pointing out the identified junk file of picture category may be provided to the user and the corresponding file may be cleaned up according to user's instructions, thereby releasing the storage space of the terminal device and making the system run smoother and faster accordingly.

The method for identifying a junk file of picture category provided in embodiments of the present disclosure, by acquiring the storage path storing files of picture category therein, acquiring the filename feature in the storage path, and determining whether the file in the storage path is a junk file of picture category according to the filename feature, may identify the junk file of picture category according to the common feature of junk files of picture category, and realize automatic identification of the junk file of picture category with high identification efficiency and accuracy, such that the junk file of picture category may be cleaned up more efficiently and accurately, the storage space of the mobile terminal may be saved, thus improving fluency and the corresponding speed of the system and improving the user experience.

Figure 2:
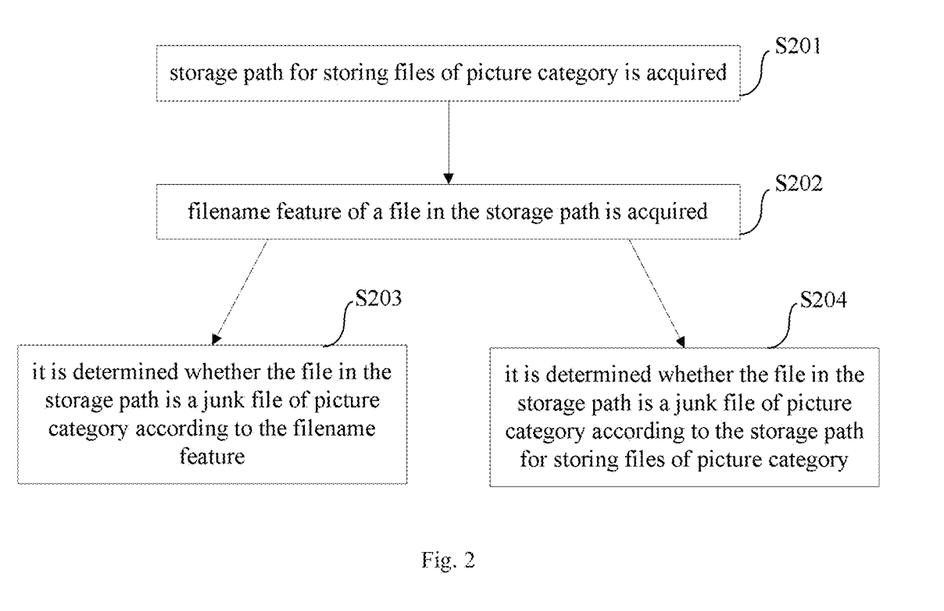
FIG. 2 is a flow chart of a method for identifying a junk file of picture category according to another embodiment of the present disclosure.

In another embodiment of the present disclosure, for junk files of picture category, the storage paths may also have some common features, therefore the method for identifying a junk file of picture category provided in embodiments of the present disclosure also includes an act of determining whether the file in the storage path is a junk file of picture category according to the storage path storing files of picture category therein. Specifically, FIG. 2 is a flow chart of a method for identifying a junk file of picture category according to another embodiment of the present disclosure. As shown in FIG. 2, the method for identifying a junk file of picture category includes followings.

S201, a storage path for storing files of picture category is acquired.

In an embodiment of the present disclosure, in order to identify the junk file of picture category, it needs to screen out the storage path storing files of picture category therein from the storage paths triggered by various applications in the terminal, thereby identifying the picture file in this storage path. Specifically, first a file category of each file in each storage path in the terminal is acquired, and then a ratio of files of picture category to all files in each storage path in the terminal is determined according to the file category, and a storage path with the ratio of files of picture category greater than a first predetermined ratio is taken as the storage path storing files of picture category therein.

The first predetermined ratio may be set as desired, e.g., which may be 90%.

S202, a filename feature of a file in the storage path is acquired.

In an embodiment of the present disclosure, the filename feature refers to a character string feature in the filename, such as the number of separators contained in the filename, a format of a character sequence in the filename, whether the filename contains a character string indicating resolution or other attribute, and the like.

S203, it is determined whether the file in the storage path is a junk file of picture category according to the filename feature.

In embodiments of the present disclosure, since the filenames of junk files of picture category have some common features, such as the filename contains a plurality of separators, the filename contains a character sequence indicating resolution attribute, the filename is a random character sequence of an MD5 value, the filename is a random number sequence, or the like. If most files in the storage path have these common features, it indicates that the file in the storage path is a junk file of the picture category. Therefore, as an alternative determining way, it may be determined whether the file in the storage path is a junk file of picture category in one or more of following ways A1, A2, A3, and A4.

S204, it is determined whether the file in the storage path is a junk file of picture category according to the storage path for storing files of picture category.

Specifically, as an alternative embodiment, determining whether the file in the storage path is a junk file of picture category according to the storage path storing files of picture category specifically includes: determining whether the storage path includes a combination of a predetermined keyword of news category and a predetermined keyword of image category; and determining that the file in the storage path is a junk file of picture category under a condition that the storage path includes the combination of the predetermined keyword of news category and the predetermined keyword of image category. The predetermined keyword of news category may be the keyword "news" triggered by applications of news category, and the predetermined keyword of image category may be the keyword "image". Specifically, for a storage path triggered by applications of news category, it is determined that the file in the storage path is a junk file of picture category under a condition that the storage path contains a combination of the keywords "news" and "image".

Certainly, if the storage path contains a combination of a keyword of shopping applications and a predetermined keyword of image category, it indicates that the file in the storage path is a picture of goods on a shopping site, and it is determined that the file in the storage path is a junk file of picture category. For example, the keyword of shopping applications may be "taobao", "jingdong" and the like.

S204 may be performed before S203 or after S203.

The method for identifying a junk file of picture category provided in embodiments of the present disclosure, may determine whether the file in the storage path is a junk file of picture category according to the keywords in the storage path, thus further improving identification efficiency and accuracy.

Figure 3:
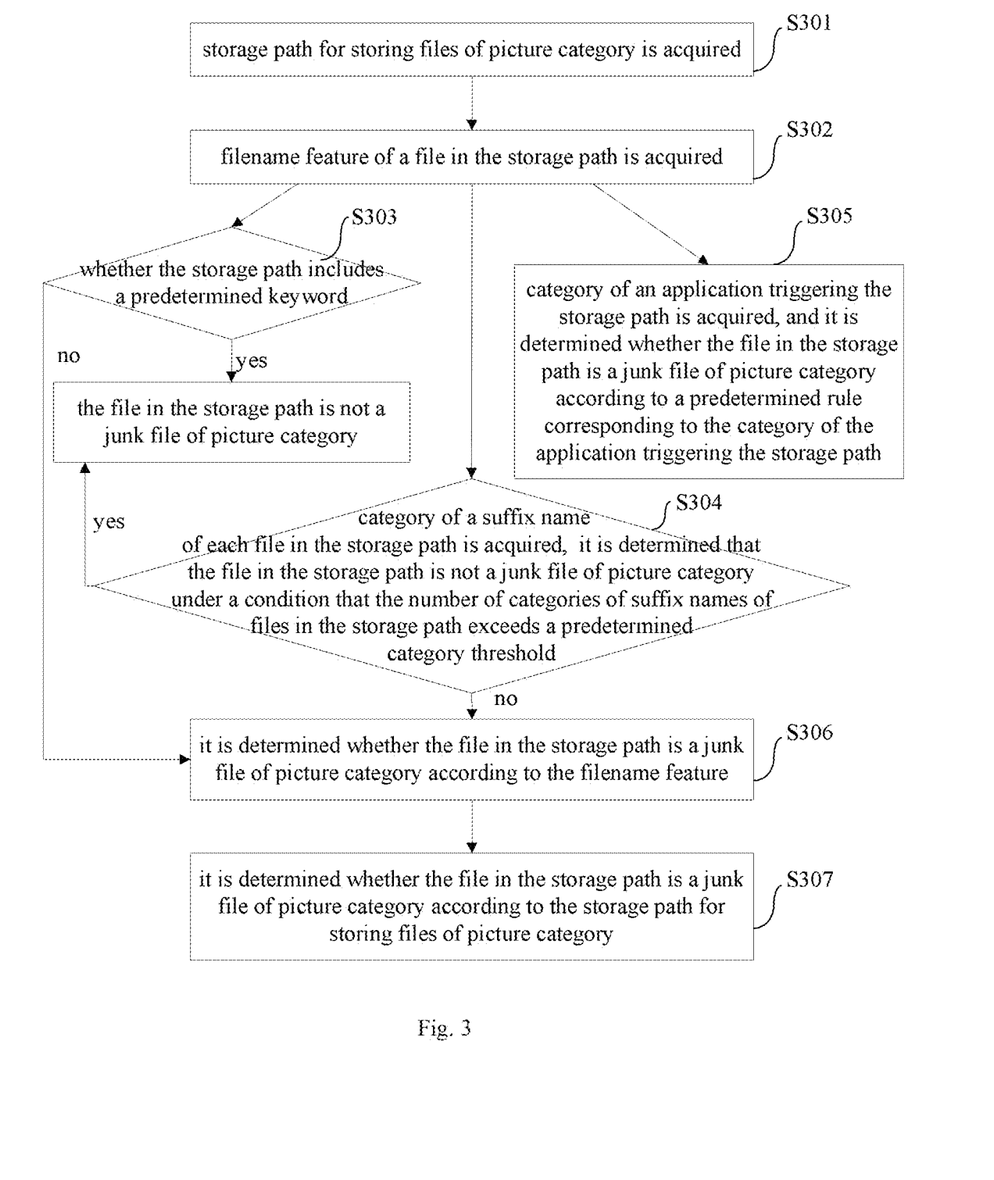
FIG. 3 is a flow chart of a method for identifying a junk file of picture category according to still another embodiment of the present disclosure.
Figure 4:
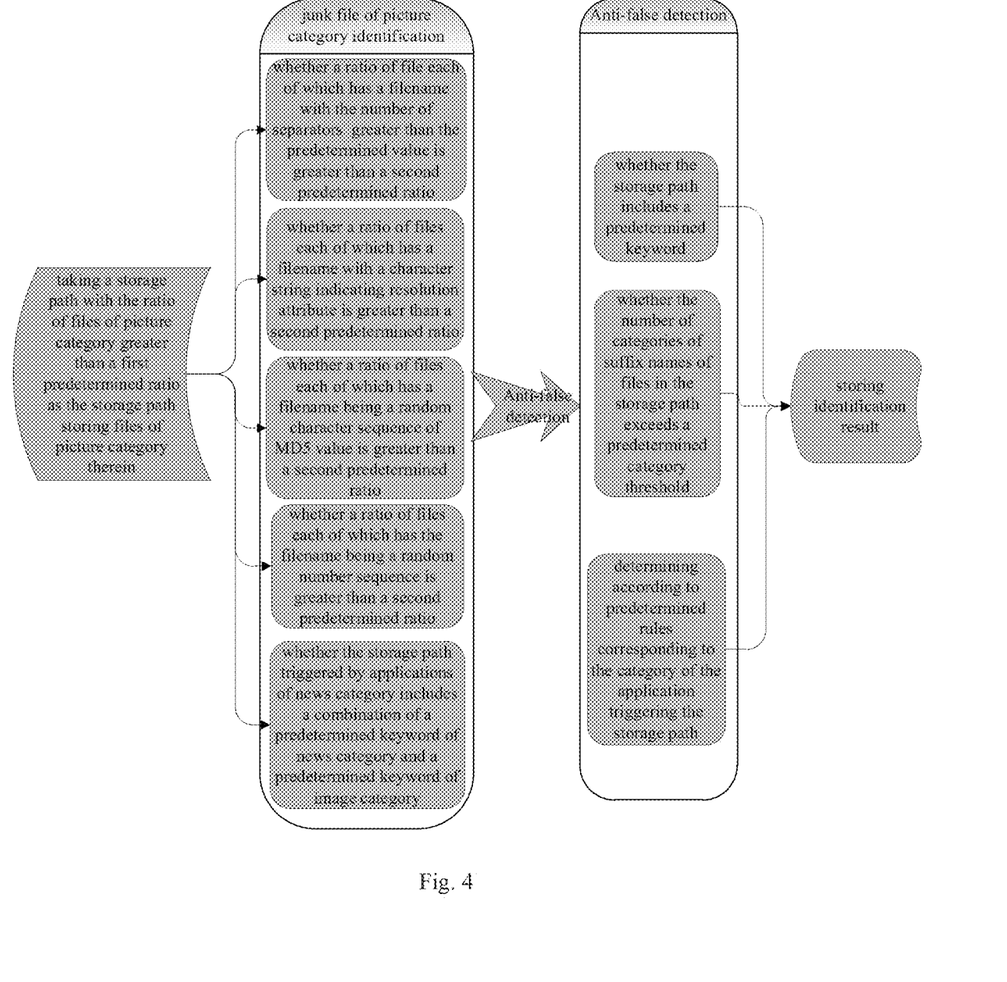
FIG. 4 is a schematic diagram of an identification procedure of a junk file of picture category according to an embodiment of the present disclosure.

In an embodiment of the present disclosure, for the acquired storage path storing files of picture category therein, although some files in the storage path have the above common features, they may be conventional files of the system or applications. Therefore, in order to prevent such conventional files of the system or applications from being determined as junk files of picture category by mistake, it may identify the conventional files of the system or applications before it is determined whether the file in the storage path is a junk file of picture category. Specifically, FIG. 3 is a flow chart of a method for identifying a junk file of picture category according to still another embodiment of the present disclosure. FIG. 4 is a schematic diagram of an identification procedure of a junk file of picture category according to an embodiment of the present disclosure. As shown in FIG. 3 and FIG. 4, the method for identifying a junk file of picture category includes followings.

S301, a storage path for storing files of picture category is acquired.

In an embodiment of the present disclosure, in order to identify the junk file of picture category, it needs to screen out the storage path storing files of picture category therein from the storage paths triggered by various applications in the terminal, thereby identifying the picture file in this storage path. Specifically, first a file category of each file in each storage path in the terminal is acquired, and then a ratio of files of picture category to all files in each storage path in the terminal is determined according to the file category, and a storage path with the ratio of files of picture category greater than a first predetermined ratio is taken as the storage path storing files of picture category therein.

The first predetermined ratio may be set as desired, e.g., which may be 90%.

S302, a filename feature of a file in the storage path is acquired.

In an embodiment of the present disclosure, the filename feature refers to a character string feature in the filename, such as the number of separators contained in the filename, a format of a character sequence in the filename, whether the filename contains a character string indicating resolution or other attribute, and the like.

S303, it is determined whether the storage path includes a predetermined keyword, and it is determined that the file in the storage path is not a junk file of picture category under a condition that the storage path includes the predetermined keyword.

The predetermined keyword may be a keyword representing the conventional files of the system or applications, such as "cover", "backup", "album", etc. If the storage path includes the predetermined keyword, it indicates that the file in the storage path is a conventional file of the system or an application, so the file cannot be determined as a junk file of picture category.

In an embodiment of the present disclosure, if the storage path does not include the predetermined keyword, i.e. the file in the storage path is a file of unknown category, S306 is performed.

S304, a category of a suffix name of each file in the storage path is acquired, and it is determined that the file in the storage path is not a junk file of picture category under a condition that the number of categories of suffix names of files in the storage path exceeds a predetermined category threshold.

Since junk files of picture category in a same storage path mostly have the same format, i.e. have the same suffix name, it indicates that the file in the storage path is not a junk file of picture category under a condition that the number of categories of the suffix names of the files in the storage path exceeds the predetermined category threshold. For example, the predetermined category threshold may be 2, and it is determined that the file in the storage path is not a junk file of picture category under the condition that the storage path includes three kinds of files, such as ".jpg", ".png", ".gif".

In an embodiment of the present disclosure, under a condition that the number of categories of the suffix names of the files in the storage path does not exceed the predetermined category threshold, i.e. the file in the storage path is a file of unknown category, S306 is performed.

S305, a category of an application triggering the storage path is acquired, and it is determined whether the file in the storage path is a junk file of picture category according to a predetermined rule corresponding to the category of the application triggering the storage path.

Specifically, in an embodiment of the present disclosure, under a condition that the category of the application triggering the storage path is an instant messaging application, it is determined that the file in the storage path is not a junk file of picture category. For example, pictures in a chat log of WeChat cannot be determined as junk files of picture category.

In an embodiment of the present disclosure, it is determined that the file in the storage path is not a junk file of picture category in S305, i.e. the file in the storage path is a file of unknown category, S306 is performed.

In an embodiment of the present disclosure, the executing order of S303, S304, S305 is not limited.

S306, it is determined whether the file in the storage path is a junk file of picture category according to the filename feature.

In embodiments of the present disclosure, since the filenames of junk files of picture category have some common features, such as the filename contains a plurality of separators, the filename contains a character sequence indicating resolution attribute, the filename is a random character sequence of an MD5 value, the filename is a random number sequence, or the like. If most files in the storage path have these common features, it indicates that the file in the storage path is a junk file of the picture category. Therefore, as an alternative determining way, it may be determined whether the file in the storage path is a junk file of picture category in one or more of following ways A1, A2, A3, and A4.

S307, it is determined whether the file in the storage path is a junk file of picture category according to the storage path for storing files of picture category.

Specifically, as an alternative embodiment, determining whether the file in the storage path is a junk file of picture category according to the storage path for storing files of picture category specifically includes: determining whether the storage path includes a combination of a predetermined keyword of news category and a predetermined keyword of image category; and determining that the file in the storage path is a junk file of picture category under a condition that the storage path includes the combination of the predetermined keyword of news category and the predetermined keyword of image category. The predetermined keyword of news category may be the keyword "news" triggered by applications of news category, and the predetermined keyword of image category may be the keyword "image". Specifically, for the storage path triggered by applications of news category, it is determined that the file in the storage path is a junk file of picture category under a condition that the storage path contains a combination of the keywords "news" and "image".

Certainly, if the storage path contains a combination of a keyword of shopping applications and a predetermined keyword of image category, it indicates that the file in the storage path is a picture of goods on a shopping site, and it is determined that the file in the storage path is a junk file of picture category. For example, the keyword of shopping applications may be "taobao", "jingdong" and the like. The above combinations of keywords are merely exemplary, in other embodiments of the present disclosure, keyword combinations corresponding to other applications may be configured as determining rules, such that the files in the storage paths triggered by different kinds of applications may be identified, thus improving the identification range and accuracy.

S306 may be performed before S307 or after S307.

In other embodiments of the present disclosure, as shown in FIG. 4, S306-S307 may be performed first. During a process of performing S306-S307, S303 and S305 are performed after triggering the determination of the file in the storage path being a junk file of picture category. The storage path not corresponding to a junk file of picture category (a conventional file of the system or an application) is excluded from the storage paths corresponding to the possible junk files of picture category, and the files in other storage paths are determined as junk files of picture category, thereby avoiding the possibility of false determination.

The method for identifying a junk file of picture category provided in embodiments of the present disclosure, may identify the conventional file which is not a junk file of picture category through some features of conventional files, thereby avoiding that the conventional file is determined as a junk file, and improving the identification accuracy, avoiding that the conventional file in the terminal is deleted, and further improving the user experience.

In order to realize the above embodiments, embodiments of the present disclosure also provide an apparatus for identifying a junk file of picture category.

Figure 5:
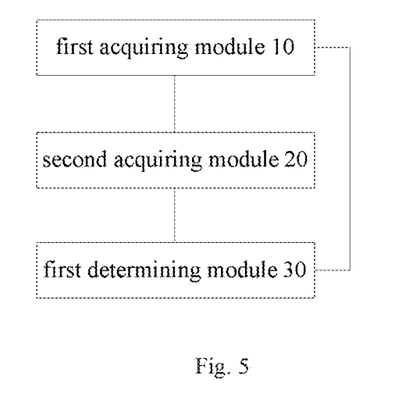
FIG. 5 is a block diagram of an apparatus for identifying a junk file of picture category according to an embodiment of the present disclosure.

FIG. 5 is a block diagram of an apparatus for identifying a junk file of picture category according to an embodiment of the present disclosure. As shown in FIG. 5, the apparatus for identifying a junk file of picture category includes a first acquiring module 10, a second acquiring module 20 and a first determining module 30.

Specifically, the first acquiring module 10 is configured to acquire a storage path for storing files of picture category. In an embodiment of the present disclosure, in order to identify the junk file of picture category, the first acquiring module 10 needs to screen out the storage path storing files of picture category therein from the storage paths triggered by various applications in the terminal, thereby identifying the picture file in this storage path. Specifically, the first acquiring module 10 is configured to acquire a file category of each file in each storage path in the terminal, and determine a ratio of files of picture category to all files in each storage path in the terminal according to the file category, and take a storage path with the ratios of files of picture category greater than a first predetermined ratio as the storage path storing files of picture category therein.

The first predetermined ratio may be set as desired, e.g., which may be 90%.

The second acquiring module 20 is configured to acquire a filename feature of a file in the storage path. In an embodiment of the present disclosure, the filename feature refers to a character string feature in the filename, such as the number of separators contained in the filename, a format of a character sequence in the filename, whether the filename contains a character string indicating resolution or other attribute, and the like.

The first determining module 30 is configured to determine whether the file in the storage path is a junk file of picture category according to the filename feature. In embodiments of the present disclosure, since the filenames of junk files of picture category have some common features, such as the filename contains a plurality of separators, the filename contains a character sequence indicating resolution attribute, the filename is a random character sequence of an MD5 value, the filename is a random number sequence, or the like. If most files in the storage path have these common features, it indicates that the file in the storage path is a junk file of the picture category. Therefore, as an alternative determining way, the first determining module 30 may determine whether the file in the storage path is a junk file of picture category in one or more of following ways A1, A2, A3, and A4. Ways A1, A2, A3, and A4 can be seen in the specific method embodiments, which are not repeated herein.

In another embodiment of the present disclosure, for junk files of picture category, the storage paths also have some common features. Therefore, the first determining module 30 is further configured to determine whether the file in the storage path is a junk file of picture category according to the storage path for storing files of picture category. More specifically, the first determining module 30 is specifically configured to determine whether the storage path includes a combination of a predetermined keyword of news category and a predetermined keyword of image category, and determine that the file in the storage path is a junk file of picture category under a condition that the storage path includes the combination of the predetermined keyword of news category and the predetermined keyword of image category. The predetermined keyword of news category may be the keyword "news" triggered by applications of news category, and the predetermined keyword of image category may be the keyword "image". Specifically, for a storage path triggered by applications of news category, it is determined that the file in the storage path is a junk file of picture category under a condition that the storage path contains a combination of the keywords "news" and "image".

Certainly, if the storage path contains a combination of a keyword of shopping applications and a predetermined keyword of image category, it indicates that the file in the storage path is a picture of goods on a shopping site, and the first determining module 30 determines that the file in the storage path is a junk file of picture category based on this. For example, the keyword of shopping applications may be "taobao", "jingdong" and the like. The above combinations of keywords are merely exemplary. In other embodiments of the present disclosure, the combinations of keywords corresponding to other applications may be configured as a criterion, thereby identifying the file in the storage paths triggered by different types of applications, and improving identification breadth and precision.

The apparatus for identifying a junk file of picture category provided in embodiments of the present disclosure, by acquiring the storage path storing files of picture category therein, acquiring the filename feature in the storage path, and determining whether the file in the storage path is a junk file of picture category according to the filename feature and/or the storage path, may identify the junk file of picture category according to the common feature of junk files of picture category, and realize automatic identification of the junk file of picture category with high identification efficiency and accuracy, such that the junk file of picture category may be cleaned up more efficiently and accurately, the storage space of the mobile terminal may be saved, thus improving fluency and the corresponding speed of the system and improving the user experience.

Figure 6:
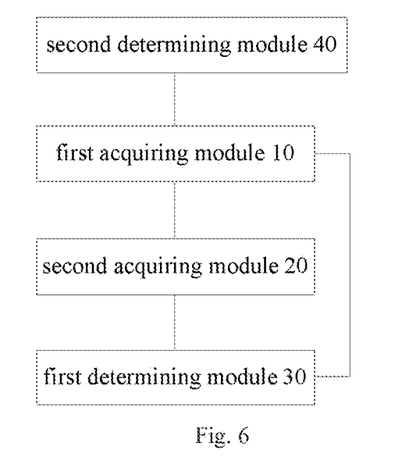
FIG. 6 is a block diagram of an apparatus for identifying a junk file of picture category according to another embodiment of the present disclosure.

FIG. 6 is a block diagram of an apparatus for identifying a junk file of picture category according to another embodiment of the present disclosure. As shown in FIG. 6, the apparatus for identifying a junk file of picture category includes a first acquiring module 10, a second acquiring module 20, a first determining module 30 and a second determining module 40.

The second determining module 40 is configured to determine whether the storage path includes a predetermined keyword before the first determining module 30 determines that the file in the storage path is a junk file of picture category, and to determine that the file in the storage path is not a junk file of picture category under a condition that the storage path includes the predetermined keyword. The predetermined keyword may be a keyword representing a conventional file of the system or an application, such as "cover", "backup", "album", etc. If the storage path includes the predetermined keyword, it indicates that the file in the storage path is a conventional file of the system or an application, so it cannot be determined as a junk file of picture category.

In an embodiment of the present disclosure, the second determining module 40 is further configured to acquire a category of a suffix name of each file in the storage path, and determine that the file in the storage path is not a junk file of picture category under a condition that a number of categories of suffix names of files in the storage path exceeds a predetermined category threshold. Since junk files of picture category in a same storage path mostly have the same format, i.e. have the same suffix name, it indicates that the file in the storage path is not a junk file of picture category under a condition that the number of categories of the suffix names of the files in the storage path exceeds the predetermined category threshold. For example, the predetermined category threshold may be 2, and it is determined that the file in the storage path is not a junk file of picture category under the condition that the storage path includes three kinds of files, such as ".jpg", ".png", ".gif".

In an embodiment of the present disclosure, the second determining module 40 is further configured to acquire a category of an application triggering the storage path, and determine whether the file in the storage path is a junk file of picture category according to a predetermined rule corresponding to the category of the application triggering the storage path. More specifically, the second determining module 40 is specifically configured to determine that the file in the storage path is not a junk file of picture category under a condition that the category of the application triggering the storage path is an instant messaging application. For example, pictures in a chat log of WeChat cannot be determined as junk files of picture category.

The apparatus for identifying a junk file of picture category provided in embodiments of the present disclosure, may identify the conventional file which is not a junk file of picture category via some features of conventional files, thereby avoiding that the conventional file is determined as a junk file, and improving the identification accuracy, and avoiding that the conventional file in the terminal is deleted, and further improving the user experience.

In order to realize the above embodiments, embodiments of the present disclosure also provide an electronic device.

The electronic device provided in embodiments of the present disclosure includes the apparatus for identifying a junk file of picture category according to any one of embodiments.

The electronic device provided in embodiments of the present disclosure, by acquiring the storage path storing files of picture category therein, acquiring the filename feature in the storage path, and determining whether the file in the storage path is a junk file of picture category according to the filename feature and/or the storage path, may identify the junk file of picture category according to the common feature of junk files of picture category, and realize automatic identification of the junk file of picture category with high identification efficiency and accuracy, such that the junk file of picture category may be cleaned up more efficiently and accurately, the storage space of the mobile terminal may be saved, thus improving fluency and the corresponding speed of the system and improving the user experience.

It should be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise", "axial", "radial" and "circumference" refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, in the description of the present disclosure, terms such as "first" and "second" are used herein for purposes of description and are not intended to indicate or imply relative importance or significance. Furthermore, in the description of the present disclosure, "a plurality of" refers to two or more unless otherwise specified.

It should be understood that, unless specified or limited otherwise, the terms "mounted," "connected," and "coupled" and variations thereof are used broadly and encompass such as fixed or detachable mountings, connections and couplings, and can be mechanical or electrical mountings, connections and couplings, and also can be direct and via media indirect mountings, connections, and couplings, and further can be inner mountings, connections and couplings of two components or interaction relations between two components, unless otherwise specified, which can be understood by those skilled in the art according to the detail embodiment of the present disclosure.

In the description of the present disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for identifying, in a terminal device, a junk file of picture category, the method comprising the following acts performed by the terminal device:
   acquiring a storage path for storing files of picture category in the terminal device;
   acquiring a filename feature of a file in the storage path;
   determining whether the file in the storage path is a junk file of picture category according to the filename feature; and
   cleaning the identified junk file of picture category from the storage path;
   wherein acquiring the storage path of the file of picture category in the terminal device comprises:

acquiring a file category of each file in each storage path in a terminal;

determining a first ratio of files of the picture category to all files in each storage path in the terminal according to the file category; and taking a storage path with the first ratio greater than a first predetermined ratio as the storage path for storing files of picture category.

2. The method according to claim 1, further comprising: determining whether the file in the storage path is a junk file of picture category according to the storage path for storing files of picture category.

3. The method according to claim 2, wherein determining whether the file in the storage path is a junk file of picture category according to the storage path for storing files of picture category comprises:

determining whether the storage path comprises a combination of a predetermined keyword of news category and a predetermined keyword of image category; and determining that the file in the storage path is a junk file of picture category under a condition that the storage path comprises the combination of the predetermined keyword of news category and the predetermined keyword of image category.

4. The method according to claim 3, before determining that the file in the storage path is a junk file of picture category, further comprising:

determining whether the storage path comprises a predetermined keyword; and determining that the file in the storage path is not a junk file of picture category under a condition that the storage path comprises the predetermined keyword.

5. The method according to claim 3, before determining that the file in the storage path is a junk file of picture category, further comprising:

acquiring a category of a suffix name of each file in the storage path; and determining that the file in the storage path is not a junk file of picture category under a condition that a number of categories of suffix names of files in the storage path exceeds a predetermined category threshold.

6. The method according to claim 3, before determining that the file in the storage path is a junk file of picture category, further comprising:

acquiring a category of an application triggering the storage path; and determining whether the file in the storage path is a junk file of picture category according to a predetermined rule corresponding to the category of the application triggering the storage path.

7. The method according to claim 1, wherein determining whether the file in the storage path is a junk file of picture category according to the filename feature comprises:

according to the filename feature, determining whether in the storage path a second ratio of files each of which has a filename with a number of separators greater than a predetermined value is greater than a second predetermined ratio; and determining that the file in the storage path is a junk file of picture category under a condition that the second ratio is greater than the second predetermined ratio.

8. The method according to claim 1, wherein determining whether the file in the storage path is a junk file of picture category according to the filename feature comprises:

according to the filename feature, determining whether in the storage path a third ratio of files each of which has a filename with a character string indicating a resolution attribute is greater than a second predetermined ratio; and determining that the file in the storage path is a junk file of picture category under a condition that the third ratio is greater than the second predetermined ratio.

9. The method according to claim 1, wherein determining whether the file in the storage path is a junk file of picture category according to the filename feature comprises:

according to the filename feature, determining whether in the storage path a fourth ratio of files each of which has a filename being a random character sequence of an MD5 value is greater than a second predetermined ratio; and determining that the file in the storage path is a junk file of picture category under a condition that the fourth ratio is greater than the second predetermined ratio.

10. The method according to claim 1, wherein determining whether the file in the storage path is a junk file of picture category according to the filename feature comprises:

according to the filename feature, determining whether in the storage path a fifth ratio of files each of which has a filename being a random number sequence is greater than a second predetermined ratio; and determining that the file in the storage path is a junk file of picture category under a condition that the fifth ratio is greater than the second predetermined ratio.

11. A terminal device configured to identify a junk file of picture category, the terminal device comprising:

a processor, a memory storing instructions executable by the processor, wherein the processor is configured by the instructions to:

acquire a storage path for storing files of picture category in the terminal device;

acquire a filename feature of a file in the storage path;

determine whether the file in the storage path is a junk file of picture category according to the filename feature; and clean the identified junk file of picture category from the storage path;

wherein the processor is configured to acquire the storage path of the file of picture category by acts of:

acquiring a file category of each file in each storage path in a terminal;

determining a first ratio of files of picture category to all files in each storage path in the terminal according to the file category; and taking a storage path with the first ratio greater than a first predetermined ratio as the storage path for storing files of picture category.

12. The terminal device according to claim 11, wherein the processor is further configured to:

determine whether the file in the storage path is a junk file of picture category according to the storage path for storing files of picture category.

13. The terminal device according to claim 12, wherein the processor is configured to determine whether the file in the storage path is a junk file of picture category according to the storage path for storing files of picture category by acts of:

determining whether the storage path comprises a combination of a predetermined keyword of news category and a predetermined keyword of image category; and determining that the file in the storage path is a junk file of picture category under a condition that the storage path comprises the combination of the predetermined keyword of news category and the predetermined keyword of image category.

14. The terminal device according to claim 13, wherein before it is determined that the file in the storage path is a junk file of picture category, the processor is further configured to:

determine whether the storage path comprises a predetermined keyword and to determine that the file in the storage path is not a junk file of picture category under a condition that the storage path comprises the predetermined keyword.

15. The terminal device according to claims 14, wherein the processor is further configured to:

acquire a category of a suffix name of each file in the storage path, and determine that the file in the storage path is not a junk file of picture category under a condition that a number of categories of suffix names of files in the storage path exceeds a predetermined category threshold.

16. The terminal device according to claim 14, wherein the processor is further configured to:

acquire a category of an application triggering the storage path, and determine that the file in the storage path is a junk file of picture category under a condition that the category of the application triggering the storage path is an instant messaging application.

17. The terminal device according to claim 11, wherein the processor is configured to determine whether the file in the storage path is a junk file of picture category according to the filename feature by acts:

according to the filename feature, determining whether in the storage path at least one of a second ratio of files each of which has a filename with a number of separators greater than a predetermined value, a third ratio of files each of which has a filename with a character string indicating a resolution attribute, a fourth ratio of files each of which has a filename being a random character sequence of an MD5 value and a fifth ratio of files each of which has a filename being a random number sequence is greater than a second predetermined ratio; and determining that the file in the storage path is a junk file of picture category under a condition that at least one of the second ratio, the third ratio, the fourth ratio and the fifth ratio is greater than the second predetermined ratio.

18. An electronic device, comprising a terminal device for identifying a junk file of picture category according to claim 11.

* * * * *